United States Patent [19]

Matsuura et al.

[11] 4,441,152
[45] Apr. 3, 1984

[54] DATA PROCESSING SYSTEM HAVING RING-LIKE CONNECTED MULTIPROCESSORS RELATIVE TO KEY STORAGE

[75] Inventors: Tsuguo Matsuura, Hadano; Shunichi Torii, Kokubunji; Tsuguo Shimizu, Hachioji, all of Japan

[73] Assignee: Hitachi, Ltd., Tokyo, Japan

[21] Appl. No.: 233,447

[22] Filed: Feb. 11, 1981

[30] Foreign Application Priority Data

Feb. 14, 1980 [JP] Japan ................................. 55-16973

[51] Int. Cl.³ ............................................ G06F 13/00
[52] U.S. Cl. .................................................. 364/200
[58] Field of Search ........................ 364/200 MS File

[56] References Cited

U.S. PATENT DOCUMENTS 4,112,489  9/1978  Wood ................................. 364/200
4,162,529  8/1979  Suzuki et al. ...................... 364/200

*Primary Examiner*—Thomas M. Heckler
*Attorney, Agent, or Firm*—Antonelli, Terry & Wands

[57] ABSTRACT

A multiprocessor system includes a plurality of central processing units (CPUs), which have a main storage in common, and a key storage for storing therein control information for storage protection of, reference to, and change in the main storage. Each CPU is provided with the key storage, the CPUs are connected by interface lines so as to form a ring-like combination, a CPU in which a key access request is generated, carries out the key processing for its own key storage and supplies the interface line with an address, data and others which are contained in the key access request, and another CPU receives the address, data and others to perform the key processing for its own key storage. A signal for determining the priority among key access requests simultaneously generated in a plurality of central processing units circulates through the CPUs via the interface lines, one of the CPUs having generated the key access requests catches the priority determining signal to make its own key access request valid, and prevents the circulation of the priority determining signal for a time till the key processing based upon the valid request has been completed.

17 Claims, 5 Drawing Figures

DATA PROCESSING SYSTEM HAVING RING-LIKE CONNECTED MULTIPROCESSORS RELATIVE TO KEY STORAGE

CROSS REFERENCES OF RELATED APPLICATIONS

This application relates to the subject matter of a copending U.S. application Ser. No. 136,492 filed on Apr. 3, 1980 now U.S. Pat. No. 4,385,351 by the present applicants and assigned to the present assignee.

BACKGROUND OF THE INVENTION

The present invention relates to data processing technology of a multiprocessor configuration, and more particularly to a method and system of performing set-storage-key and insert-storage-key processing for a key storage (hereinafter referred to as "KS"), which stores therein key information concerning a main storage (hereinafter referred to as "MS"), in an information processing system in which a plurality of information processing units have an MS in common.

In an ordinary single-CPU type or multiprocessor type computer system, there is employed a so-called multiprogramming system in which a plurality of programs are processed in a time sharing manner, in order that a plurality of users can employ the same equipment effectively. In the multiprogramming system, different programs use the same main storage, and therefore a storage protection mechanism must be provided to prevent a program from accessing an exclusive region for another program. One approach to providing storage protection is to divide the main storage into several blocks, each of which includes 2 K bytes and is used as the unit of storage protection, and to allot storage keys to the blocks. In this case, each of the programs is given a protection key having the same value as a corresponding storage key. When the program accesses the main storage, the protection key is compared with the storage key. In the case where these keys are identical to each other, or in the case where the protection key is equal to zero, a write operation for a block is allowed. In other cases, however, the write operation is not allowed but an alarm signal is issued. The protection keys are stored in a storage for exclusive use, which is called a key storage (that is, "KS"). Such a storage protection system is disclosed in a Japanese Patent Publication No. 23672/1969 dated Oct. 7, 1969, which is based upon a U.S. Application Ser. No. 334,714 filed on Dec. 31, 1963. In recent computer systems, the key storage stores therein various keys in addition to the protection key. For example, a fetch protection bit is used simultaneously with the storage key. When the fetch protection bit is zero, protection is given only to the write operation. When the fetch protection bit takes the level of "1", protection is given not only to the write operation but also to the fetch operation. Further, a reference bit and a change bit are provided in the key storage.

In order to obtain a high speed information processing system, as regards the MS, the number of banks, each of which forms the operation unit, is increased and the parallel processing capability for the banks is implemented to increase the speed of processing. However, since several kilo-bytes in the MS is provided to correspond to one address in the KS, the multi-bank method in the MS stated above cannot be employed in the KS. Accordingly, the processing for the KS is made at one or one-half machine cycle, to make the processing capability of the KS equivalent to that of the MS.

On the other hand, in a multiprocessor system in which a plurality of processing units hold the MS in common, the MS and KS are theoretically common to all of the processing units, and are therefore required to have a large processing capability. As regards the MS, such a request can be fulfilled by increasing the number of banks and by enhancing the parallel processing for the banks, and as regards the KS, the above request can be accomplished by providing a KS in each processing unit. In this case, theoretically speaking, a key request priority determining unit may be common to the processing units, and this unit will determine the priority among key access requests which are simultaneously generated in the processing units.

For example, in a multiprocessor system which can include four central processing units (hereinafter referred to as "CPU") at the most, it is required to provide in the key request priority determining unit interfaces for CPUs and address sensing circuits, and the number of interfaces and the number of address sending circuits are made equal to the above-mentioned largest number, or four. When the system includes only two CPUs, those interfaces and address sending circuits in the key request priority determining unit which correspond to two CPUs, are not in use. That is, the system lacks the flexibility with respect to the number of CPUs included therein.

Generally speaking, in computer systems including one or more central processing units, when interface circuits with respect to the KS are formed of similar units, some of the interface circuits will not be in use if the number of interface circuits is optimized in a state that the systems include the largest number of central processing units. Therefore, such a system configuration is undesirable from the viewpoint of cost effectiveness. With respect to present day general-purpose large-scale computers, a computer system including two or less central processing units is widely employed, and various interface circuits are optimized, or standardized for such a system configuration. However, it is desired that the interface circuit with respect to the KS is optimized independently of the number of central processing units included in the system.

SUMMARY OF THE INVENTION

An object of the present invention is to provide a multiple information processing system in which each of the processing units is standardized with respect to a KS interface and the number of processing units can be readily varied without producing a high cost performance.

Another object of the present invention is to provide a multi-processor system in which the number of processing units can be varied in a manner that an interface modification is as small as possible.

A further object of the present invention is to provide an optimal method of accessing KS's included in a plurality of processing units.

In order to attain the above objects, according to the basic conception of the present invention, each of a plurality of central processing units (CPUs) is provided with a KS, and there is provided means for connecting all the CPUs to form a ring-like combination with respect to the KS's. In more detail, a central processing unit which has issued a set-storage-key (hereinafter referred to as "SSK") request, sets key data in its own KS, and then the address and key data contained in the request are applied to ring-like connecting means. Another CPU which receives the address and the key data through the connecting means, sets the key data in that region in its own KS which is indicated by the address. Further, prior to the above processing, the priority among key access requests which may be simultaneously generated in a plurality of CPUs, is determined by catching a signal (that is, a priority determining signal) which circulates through CPUs along a ring-like path or circular path.

According to the present invention, a plurality of CPUs are connected so as to form a ring-like combination, the key information is supplied from the preceding CPU and then supplied to the succeeding CPU, that is, the key information is sent in one direction, and the key processing is made for a KS included in each CPU. Accordingly, a desired number of CPUs, each of which is standardized, can be included in a multiprocessor system with a high cost performance, and theoretically speaking, the read and write processing (in which control information, an address and data are read and written) for respective KS's included in the CPUs can be made simultaneously.

BRIEF DESCRIPTION OF THE DRAWINGS

FIG. 2 shows a transfer system of key information, and FIG. 3 shows a transfer system of a priority determining signal.

DESCRIPTION OF THE PREFERRED EMBODIMENTS

In order to facilitate the understanding of the present invention, prior to the disclosure of an embodiment of the present invention, explanation will be made of an example of a general KS interface network which is employed to increase the processing capability in a multiprocessor system, with reference to FIG. 1 by way of example.

Figure 1:
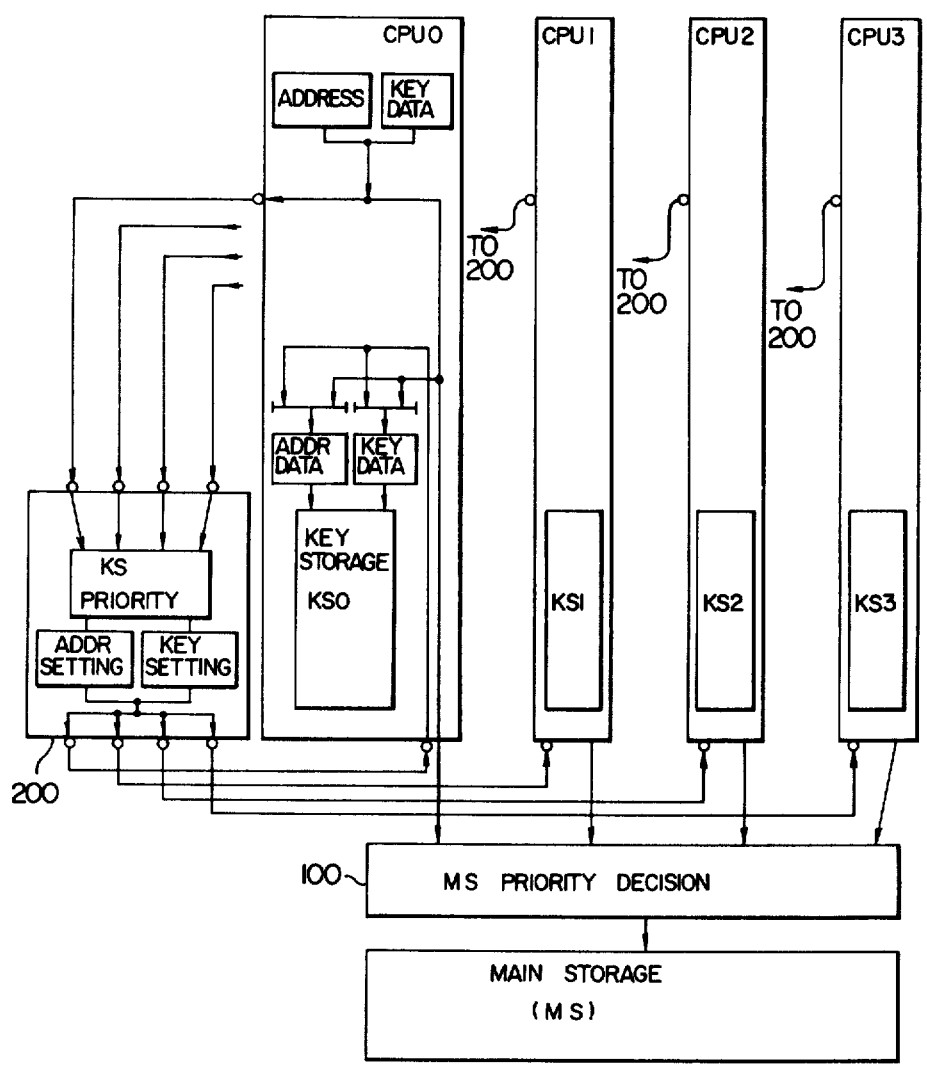
FIG. 1 is a schematic block diagram for explaining a general conception of key processing in a multiprocessor system.

FIG. 1 shows a general system configuration for key processing in which four central processing units CPU0 through CPU3 have access to a single main storage MS in common. Referring to FIG. 1, the units CPU0 through CPU3 include key storages KS0 through KS3, respectively. Each of the key storages KS0 through KS3 stores therein key information with respect to the single MS. Since the key storages KS0 through KS3 are required to have the same content for the protection bit, when a central processing unit issues an SSK request, respective contents of the key storages must be updated in an interlocking manner. Such an updating operation is also required for an insert-storage-key (hereinafter referred to as "ISK") request.

As is well known, the key information includes information concerned with a so-called address transformation involving the translating of logical addresses into real addresses and is given by a reference bit. In more detail, the reference bit takes the level "1" when a corresponding block is subjected to a read or write operation. The key information includes a change bit. The change bit is set when data is stored in the MS. Each CPU updates only the change bit and the reference bit in a KS corresponding to the CPU when accessing the MS. Accordingly, the contents of individual KS's provided correspondingly for individual CPUs are different from one another.

In the case where a plurality of CPUs simultaneously issue SSK (or ISK) requests, since there is a possibility that the requests indicate the same address, the requests must be processed serially. For this reason, a priority has to be determined among the requests from the CPUs. In FIG. 1, a reference numeral 200 designates a key request priority determining unit for determining the above priority. The unit 200 generates priority data and a command. The priority among the requests generated in the central processing units CPU0 through CPU3 is determined by the key request priority determining unit 200, and then an accepted request is sent from the unit 200 to each of the units CPU0 through CPU3 to update the key storages KS0 through KS3 included respectively in the units CPU0 through CPU3. Further, the priority among requests which are issued for the units CPU0 through CPU3 to the MS, is determined by an MS request priority determining unit 100, but the parallel processing is carried out for different banks of the MS. Accordingly, the priority determination is made only for a bank, for which the requests conflict with each other.

As shown in FIG. 1, in such a multiple information processing system there is provided a key request priority determining unit 200 for common use, in order to determine the priority among key access requests which are simultaneously generated in a plurality of CPUs. That is, an exclusive unit for determining the priority is required. Further, it is required in the system to take into consideration the capacity of the interface which depends upon the number of central processing units. That is, when the number of central processing units is extensively increased, substantial and extensive changes are required in the interface disadvantageously.

The present inventors have overcome the above difficulties by applying to the connection among multiple KS's the conception of a ring structure which is disclosed in the above-referenced copending U.S. Application Ser. No. 136,492.

Figure 2:
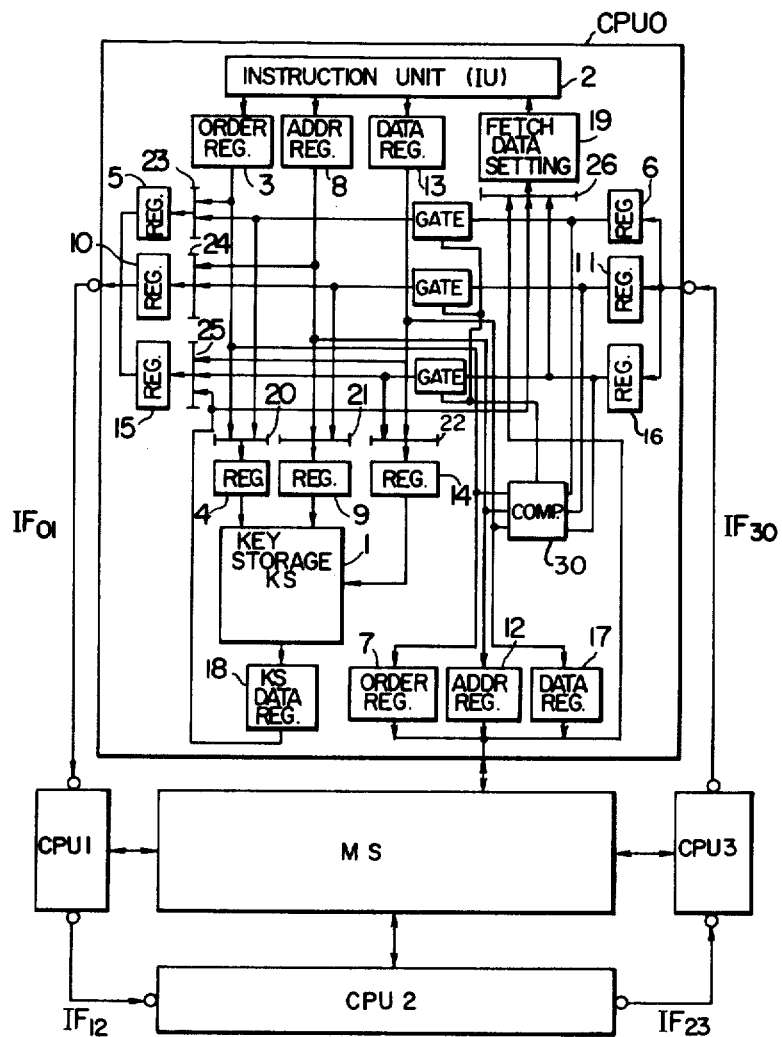
FIGS. 2 and 3 are block diagrams showing an embodiment of the present invention.
Figure 3:
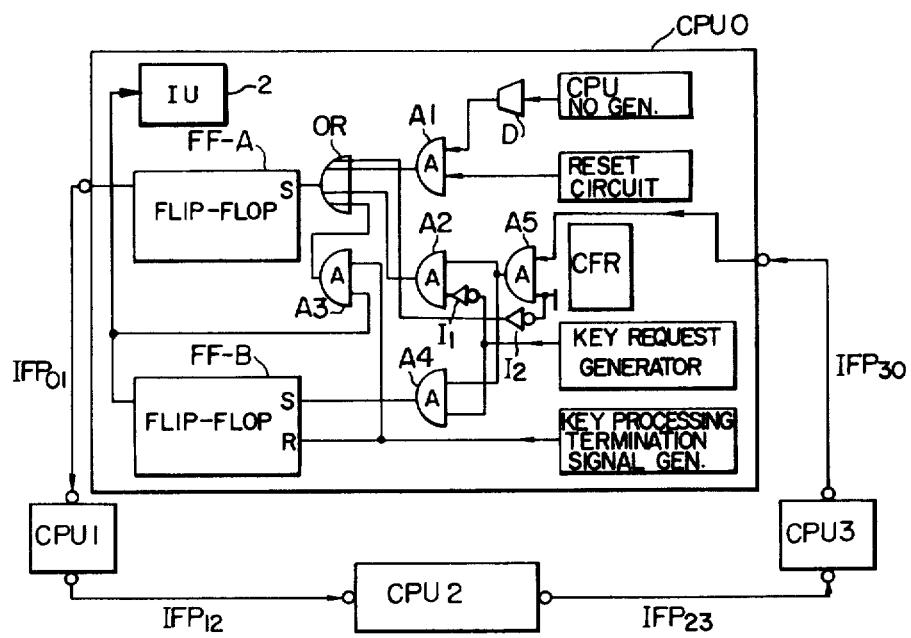

FIGS. 2 and 3 show an embodiment of the present invention in which four central processing units CPU0 through CPU3 are connected to a main storage MS, that is, have a common MS, and the central processing units CPU0 through CPU3 each includes a key storage. Accordingly, the number of central processing units can be varied at any desired time in compliance with needs based on the system scale. FIG. 2 shows a transfer system for key information, such as address and key data, and FIG. 3 shows a transfer system for a priority determining signal. In FIGS. 2 and 3, the central processing units CPU0 through CPU3 have the same structure and therefore only the structure of the unit CPU0 is shown in detail. Further, those parts which are not essential to the present invention are omitted in FIGS. 2 and 3. Refer to the above-referenced copending U.S. Application for the input/output devices, for example.

Figure 4:
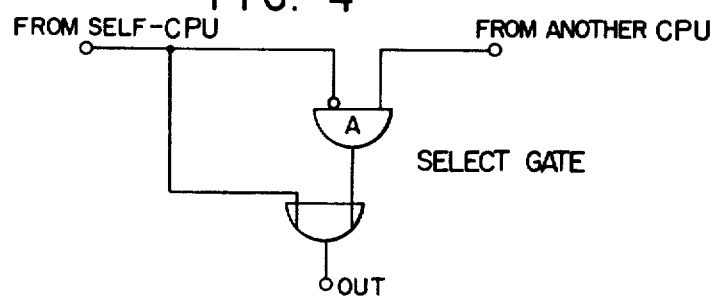
FIG. 4 is a circuit diagram showing a circuit configuration of the select gate shown in FIG. 2.

Reference is made first to FIG. 2. When a key-write instruction SSK request is generated in an instruction unit (IU)2 the IU 2 issues a key access request from a key request generator provided therein as shown in FIG. 3 described later. When a flip-flop FF-B is set, so that the CPU 0 receives an instruction for processing with a priority, i.e., priority determining signal, IU 2 sets an order (O), address (A) and data (D) included in the request in registers 3, 8 and 13, respectively. In FIG. 2, reference numeral 3 designates an order register, 8 an address register, and 13 a data register. The term "order" means information obtained by coding various requests for the MS and KS. In this case, the SSK operation is coded, and this coded information is set in the register 3. The order, address and data, which are set in the registers 3, 8 and 13, are sent through select gates 20, 21 and 22 to registers 4, 9 and 14, respectively, and set therein, in order to update the key storage KS1 provided in the unit CPU0. An example of the circuit configuration of the select gate is shown in FIG. 4. Since the order set in the register 4 indicates the SSK processing, the SSK processing is performed for the key storage KS1. A write address and data to be written are given by the registers 9 and 14, respectively. As mentioned above, the registers 4, 9 and 14 can perform the read/write operation for the key storage.

On the other hand, in order to perform the SSK processing for KSs included in the other central processing units CPU1 through CPU3, the order, address and data which are set in the registers 3, 8 and 13, are applied through select gates 23, 24 and 25 to information transmitting registers 5, 10 and 15, respectively, to be set therein, and then applied on interface lines $IF_{01}$ through $IF_{30}$ for connecting the units CPU0 through CPU3 in cascade in a circular path. The order, address and data on the ring-like interface lines are fetched by the units CPU1, CPU2 and CPU3 in the order described, to update respective KS's of the units CPU1, CPU2, and CPU3, and then return to the unit CPU0. The order, address and data which have returned back to the unit CPU0 are set in, or latch, information receiving registers 6, 11 and 16, respectively. As mentioned previously, in the case where the unit CPU0 has issued the SSK request, the request is stored in the instruction registers 3, 8 and 13. When the order, address and data latch the information receiving registers 6, 11, and 16, a judging circuit formed of a coincidence circuit such as a comparator circuit 30, which is provided in each of the units CPU0 through CPU3, compares the contents of the registers 3, 8 and 13 with the contents of the register 6, 11 and 16 and causes the SSK processing to terminate when the former contents coincide with the latter contents. The judging circuit is the same as that disclosed in the above-referenced copending U.S. Application is provided in each central processing unit. The input and output ports of each CPU are preferable to have a latch function.

Next, explanation will be made of the SSK processing in the central processing unit CPU0 in the case where other central processing units than the unit CPU0 issue the SSK request. Like the above-mentioned case, when the request is issued by one of the units CPU1 through CPU3, an order, address and data are applied on the interface lines. The order, address and data on the interface line $IF_{30}$ between the units CPU3 and CPU0 are set in the information receiving registers 6, 11 and 16 of the unit CPU0, respectively. The contents of the registers 6, 11 and 16 are sent through the select gates 20, 21 and 22 to the KS read/write registers 4, 9 and 14, respectively, to be set therein and to perform the SSK processing for the key storage KS1. In order to transfer the SSK request to the succeeding unit CPU1, the order, address and data in the information receiving registers 6, 11 and 16 of the unit CPU0 are sent through the select gates 23, 24 and 25 to the information sending or transmitting registers 5, 10 and 15 to be set therein, and then are sent to the unit CPU1 through the interface line $IF_{01}$ between the units CPU0 and CPU1. As mentioned above, the signals are transferred in a single direction on the interface lines, which connect a plurality of central processing units so as to be arranged a ring-like structure, through the information transmitting and receiving registers. FIG. 4 shows an example of the select gates.

In the foregoing description, the SSK processing has been explained. The ISK processing is approximately the same as the SSK processing, but differs from the SSK processing in that the key data read out of respective key storages of the central processing units are sent to that central processing unit which has issued the ISK request. Accordingly, when the reference bit of corresponding key data in the key storage of a central processing unit takes the level "1", the corresponding key data is reflected in the key data read out of that central processing unit which has issued the ISK request. In more detail, in the ISK processing performed in one of the other central processing units than that central processing unit which has issued the ISK request, key data read out of the KS is set in a KS data register 18. The content of the register 18 and that content of the register 16, which has been sent through the ring-like interface lines, are subjected to an OR operation by the select gate 25, the output of which is set in the information transmitting register 15 to be applied on the ring-like interface line IF. In this case, the select gate 25 selects the input from the KS data register 18 and that from the receiving register 16, simultaneously. The final operation of the ISK processing in the central processing unit which has issued the ISK request, is to perform an OR operation for the key data read out of the KS of the above central processing unit and the key data read out of other central processing units, and then to send the result of the above operation to the instruction unit 2. In more detail, when the central processing unit CPU0 issues the ISK request, the key data read out of the key storage 1 i.e., KS0 of the unit CPU0, is set in the KS data register 18, and the key data sent from the unit CPU3 is set in the receiving register 16. The content of the register 18 and the content of the register 16 are sent through the select gate 26 to a fetch data setting register 19 to be set therein, and then sent to the instruction unit 2. Incidentally, reference numerals 7, 12 and 17 designate order, address and data registers used in the fetch and store operations for the MS, respectively. These registers have no direct connection with the present invention, and therefore further explanation thereof is omitted. A signal indicating the termination of the SSK and ISK processing is used as a key processing termination signal in a priority determining circuit, which will be described later.

Reference is made next to FIG. 3, which shows a priority circuit for determining the priority in key processing among the central processing units, prior to the transmission and reception of an order, address and data used in the key processing. Although FIG. 3 shows the details of only the CPU 0, the other CPUs 1, 2 and 3 have the same circuit arrangement as that of CPU 0.

Figure 5:
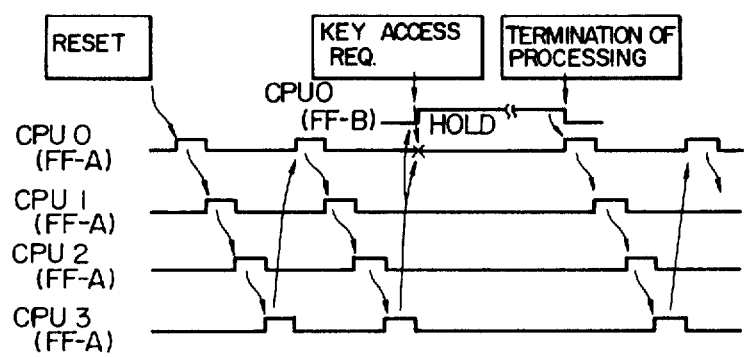
FIG. 5 is a timing chart for explaining the operation of the transfer system shown in FIG. 3.

The priority determining signal which circulates between the ring-like connected central processing units sequentially, is initiated in a predetermined central processing unit, when the system is initialized (in the usual case, when a reset signal is generated). The priority determining signal initiated in the predetermined central processing unit circulates on the ring-like interface lines $IFP_{01}$, $IFP_{12}$, $IFP_{23}$ and $IFP_{30}$. The priority determining signal exists only in one of the central processing units at a time and is present for a predetermined period. The priority is given to a central processing unit which has caught the above priority signal, that is, held a one-machine-cycle pulse. FIG. 5 is a time chart showing the above operation, and shows the case where a priority determining signal is initiated in the unit CPU0. In FIG. 3, a CPU N0 generator constantly generates the identification number of that CPU with a timing as seen in FIG. 5. Accordingly, CPU 0 generates 0 (binary "00"), CPU 1 generates 1 ("01"), CPU 2 generates 2 ("10") and CPU 3 generates 3 ("11"), respectively, at sequential times. A decoder D provides an output "on" when CPU N0 is 0. At this time, only the output of the decoder D in the CPU 0 becomes "on" and the outputs of decoders D in the other CPUs do not become "on". When the system is initialized and consequently a reset signal is generated by a reset circuit in the CPU 0, a pulse produced by differentiating the trailing edge of the reset signal from the reset circuit is applied to an AND gate A1 for ANDing the pulse and the output of CPU N0 0. Since the other CPUs have no outputs "on" at their decoders D at this time, the AND gates A1 of the other CPUs are not enabled. Thus, since the number 0 of only CPU 0 issues, the AND gate A1 for CPU 0 is enabled. The output of the gate A1 turns an OR gate OR on, and then sets a transmitting/receiving flip-flop FF-A. The flip-flop FF-A is connected to the unit CPU1 through a interface line $IFP_{01}$ which is a part of the circular path, and the output of the flip-flop FF-A sets the flip-flop FF-A of the subsequent unit CPU1 through the gates A5, A2 and OR of the unit CPU1. Similarly, the output of the flip-flop FF-A of the unit CPU1 sets respective flip-flops FF-A of the units CPU2 and CPU3 through interface lines $IFP_{12}$ and $IFP_{23}$. The output of the flip-flop FF-A of the unit CPU3 is supplied to the unit CPU0 through an interface line $IFP_{30}$. The above signal supplied to the unit CPU0 is inputted to an AND gate A5. The other input part of the AND gate A5 is connected to a multiprocessor-configuration indicating bit of a known configuration register CFR and the above bit takes an ON-state when the system has a multiprocessor configuration. Accordingly, the AND gate A5 turns on, and an AND gate A2 turns on when the key access request is not issued. Thus, the flip-flop FF-A of the unit CPU0 is again set. In other words, the flip-flop FF-A again sends the priority determining signal to the succeeding unit CPU1, and the priority determining signal circulates around the circular path in this way so long as no key access request issues.

When a key access request issues in a CPU, its key request generator (which is constituted by logic in the IU 2 of FIG. 2) generates a signal "1". FIG. 5 indicates the case where CPU 0 issued a key access request as labeled by KEY ACCESS REQUEST therein. In the CPU 0, if the key request generator generates a logical "1" signal, the AND gate A2 is disabled through an inverter $I_1$. At that time, when the priority determining signal circulates from CPU 3 to CPU 0 and is then applied to the AND gate A4 through the AND gate A5, the AND gate A4 turns on to set the flip-flop FF-B. In response to setting of the flip-flop FF-B, the set signal of flip-flop FF-B is applied to IU 2 of CPU 0 (in FIG. 2). The IU 2 then sets an order (0), address (A) and data (D) in the registers 3, 8 and 13, respectively as previously stated, to thereby start the execution of key-processing (accessing) for the KS 1. During turning-on of the FF-B in CPU 0 the order, address and data set in the register 3, 8 and 13 are applied to the CPUs 1 to 3 through the ring-like (circular-path) interfaces $IF_{01}$, $IF_{12}$ and $IF_{23}$, as stated above to execute accessing to the key storage in each of CPUs 1 to 3 as similarly as in the CPU 0. The time required for key-processing to all CPUs can be predetermined to be substantially constant, and a termination signal from a key processing termination signal generator in a CPU which has issued a key access request is applied to the AND gate $A_3$. When the AND gate $A_3$ receives both the termination signal and the set output of the flip-flop FF-B it turns on, thereby to set the flip-flop FF-A. The flip-flop FF-B is reset by the termination signal. When the flip-flop FF-A is set, the priority determining signal begins to circulate through the CPUs again as indicated in FIG. 5. Thus, the collision for the priority can be avoided when a plurality of central processing units simultaneously issue key access requests. In the transfer system for the priority determining signal shown in FIG. 3, the priority-determining-signal initiating circuit may be provided in each central processing unit for the purpose of standardization. It is needless to say that the above circuit may be provided only in a specified CPU.

The circuit configuration shown in FIGS. 2 and 3 only illustrates one embodiment of the present invention. For example, it is possible to employ, as the address interface lines IFs shown in FIG. 2, address interface lines for cancelling a store in a buffer storage, which is provided in a data processing system disclosed in the above-referenced U.S. Application Ser. No. 136,492 (based upon a Japanese patent application No. 41118/1979). Since the frequency of key access request is usually lower than the frequency of buffer cancel request, the processing capability for buffer cancel is not lowered when the address interface lines for buffer cancel are further employed as the address interface lines IFs. When interface lines are employed both for buffer cancel and for key-access-request transfer, the number of interface lines is reduced, and therefore it is possible to design a system of high cost performance.

We claim:

1. A data processing system comprising:
   (a) a main storage (MS):
   (b) a plurality of central processing units (CPU) having said main storage in common;
   (c) key storage (KS) means provided in each of said central processing units, for storing control information for the main storage;
   (d) connecting means for connecting said central processing units in cascade in a circular path; and
   (e) key processing control means provided in each of said central processing units, for accessing said key storage means provided in one of said central processing units when a key access request is issued in said central processing unit, and for supplying the content of said key access request including an address, an order and data via said connecting means to all of the other central processing units to access said key storage means provided in said other central processing units, and for preventing the content of said key access request generated by said one of said central processing units from being transferred back to the same unit.

2. A data processing system according to claim 1, wherein said key processing control means includes transfer means for transferring said content of said key access request, which is given from the other central processing unit through said connecting means, to said key storage means, and wherein said key storage means include means for updating key data in a corresponding region of said key storage means on the basis of said content of said key access request from said transfer means.

3. A data processing system according to claim 1 or 2, wherein said content of said key access request includes a command and the number of a central processing unit in addition to said address, said order and said key data.

4. A data processing system according to claim 3, wherein said preventing means in each of said central processing units includes comparing means for comparing the number thereof with the number of the other central processing unit received through said connecting means, and means responsive to said comparing means for preventing the content of said key access request from being tranferred to the next central processing unit via said connecting means.

5. A data processing system according to claim 4, wherein said key processing control means include a plurality of register means connected in cascade, and wherein said address, said order, said key data and said number of said central processing unit which are contained in said key access request, are transferred to succeeding register means in synchronism with each other.

6. A data processing system according to claim 1, wherein a specified one of said plurality of central processing units comprises priority generating means for generating a priority determining signal, said system comprising means for circulating said priority determining signal generated from said priority generating means through the circular path between said plurality of central processing units successively, said plurality of central processing units each further comprising means responsive to reception of said priority determining signal circulating between the central processing units in one central processing unit which has issued a key access request for validating said key access request, and inhibit means for inhibiting the circulation of said priority determining signal until accessing to said key storage by said key access request has completed over said plurality of central processing units.

7. A data processing system comprising:
(a) a main storage (MS):
(b) a plurality of central processing units (CPU) having said main storage in common,
each of said central processing units including, key storage (KS) means for storing therein control information for the main storage,
input means,
output means,
means for accessing said key storage means included in said central processing unit in response to a key access request generated in said central processing unit, means for applying the content of said key access request to said output means, and first transfer means responsive to the content of a key access request at said input means for selectively transferring the content of said key access request to said output means, and second transfer means for transferring the content of a key access request at said input means to said key storage means; and
(c) connecting means for connecting said plural central processing units in cascade in a circle in such a manner that the output means of one unit is connected to the input means of another unit so as to cause coupling of the content of said key access request from one unit to another sequentially in accordance with the operation of said first transfer means in each unit.

8. A data processing system according to claim 7, wherein a specified one of said plurality of central processing units comprises priority generating means for generating a priority determining signal, said system comprising means for circulating said priority determining signal generated from said priority generating means through the circular path between said plurality of central processing units successively, said plurality of central processing units each further comprising means responsive to reception of said priority determining signal circulating between the central processing units in one central processing unit which has issued a key access request for validating said key access request, and inhibit means for inhibiting the circulation of said priority determining signal until access to said key storage by said key access request has completed over said plurality of central processing units.

9. A data processing system according to claim 8, wherein each of said input and output means is formed of a plurality of register means, and said input and output means transfer an address, order, key data and the number of a central processing unit, which are contained in one key access request, to succeeding register means in synchronism with each other.

10. A data processing system comprising:
a main memory;
a plurality of central processing units, said main memory being accessed by said central processing units in common; and
connecting means for connecting said central processing units in cascade in a circular path;
each of said central processing units comprising
key memory means for storing key information for the control of the main memory, said key memory means being accessed in response to a key access request issued from the central processing unit, and
key access request transfer means for supplying a key access request to said connecting means to send said key access request to the next central processing unit when said key access request is issused in its own central processing unit or is delivered from the preceding central processing unit, whereby all the key memory means are accessed to execute key processing for each central processing unit.

11. A central processing unit for use in a multiprocessor system comprising:
(a) key storage (KS) means for storing therein key information for storage protection in a shared main storage;
(b) key information transmitting means;
(c) key information receiving means;
(d) means for connecting said key information transmitting means and said key information receiving means;

(e) means for accessing said key storage means in response to a key access request in said central processing unit, and for supplying to said key information transmitting means the content of said key access request as an address, data and an order;

(f) transfer means for supplying to said key storage means the content of said key access request at said key information receiving means; and (g) terminals provided in said key information transmitting means and said key information receiving means to be connected to key information receiving means of another central processing unit and key information transmitting means of a further central processing unit, respectively.

12. A method of forming a multiprocessor system comprising the steps of:

(a) providing a plurality of central processing units having a main storage in common;

(b) providing a key storage in each of said central processing units, said key storage storing therein control information for the main storage;

(c) providing interface means for connecting said central processing units in cascade in a circular path;

(d) accessing the key storage provided in one of said central processing units when said one central processing unit issues a key access request, and sending information contained in said key access request including an address, an order and data to a succeeding central processing unit through said interface means; and (e) accessing a key storage provided in said succeeding central processing unit when said succeeding central processing unit receives said information in said key access request through said interface means, and sending said information contained in said key access request to a central processing unit following said succeeding central processing unit in order to access respective key storages provided in said central processing units successively.

13. A method according to claim 12, further comprising circulating a priority signal between said central processing units through said interface means on a time sequential basis independent of the time of generation of said key access request, and wherein one of the central processing units having generated a key access request makes valid the key access request generated in said central processing unit, and said central processing unit holds said priority signal for a predetermined time till the key processing based upon said key access request has been completed.

14. A method according to claim 13, wherein said priority signal is a pulse of one machine cycle which is generated in a specified one of said central processing units provided in said multiprocessor system.

15. A method according to claim 12, 13, or 14, comprising the further steps, when a set-storage-key request is generated, of indicating in said central processing unit having generated a key access request that the key processing based upon the set-storage-key request is being carried out, comparing the content of a key request which is received from another central processing unit and the content of said set-storage-key request with each other to judge a coincidence and terminating the key processing based upon said set-storage-key request upon detection of the coincidence.

16. A method according to claim 15, wherein when an insert-storage-key request is generated, key data read out of respective key storages provided in said central processing units are sent to said central processing unit having generated said request.

17. A method according to claim 12, 13 or 14, wherein said interface means are interface lines connected between transmitting and receiving terminals of adjacent central processing units, and said control information includes a protection bit, a reference bit and a change bit.

* * * * *